US00RE39757E

(19) United States
(12) Reissued Patent
Yamashita

(10) Patent Number: US RE39,757 E
(45) Date of Reissued Patent: Aug. 7, 2007

(54) BREAK LEVER STROKE ADJUSTING MECHANISM

(75) Inventor: Kazuhisa Yamashita, Sakai (JP)

(73) Assignee: Shimano Inc., Osaka (JP)

(21) Appl. No.: 10/212,863

(22) Filed: Aug. 7, 2002

Related U.S. Patent Documents

Reissue of:
(64) Patent No.: 6,112,614
Issued: Sep. 5, 2000
Appl. No.: 08/598,578
Filed: Feb. 12, 1996

(51) Int. Cl.
*G05G 11/00* (2006.01)

(52) U.S. Cl. ..... 74/489; 74/502.2
(58) Field of Classification Search ..... 74/489, 74/502.2
See application file for complete search history.

(56) References Cited

U.S. PATENT DOCUMENTS 4,611,500 A * 9/1986 Nagano ..... 74/489
4,916,967 A * 4/1990 Nakamura ..... 74/502.2
5,448,927 A * 9/1995 Lumpkin ..... 74/502.2
5,515,743 A * 5/1996 Lumpkin ..... 74/502.2
5,537,891 A * 7/1996 Nagano et al. ..... 74/525
5,575,178 A * 11/1996 Wu ..... 74/489

FOREIGN PATENT DOCUMENTS

JP 7-9693 * 2/1995

* cited by examiner

*Primary Examiner*—David Fenstermacher
(74) *Attorney, Agent, or Firm*—Global IP Counselors, LLP

(57) ABSTRACT

A brake lever arm is mounted to a base member, with the base member fixed to a bicycle handlebar. The lever arm is pivotal about a pivot point on the base. The lever arm includes an adjusting mechanism that adjusts the position of the lever arm when the lever arm is in a brake dis-engaged position. The adjusting mechanism is slideable in grooves in the lever arm such that the adjusting mechanisms may be moved to positions that are differing distances away from the pivot point. The adjusting mechanism includes a contact member that engages a brake cable connected to the lever arm when the lever arm is moved from the brake disengaged position toward a brake engagement position. The position of the contact member with respect to the pivot point determines the effect movement of the lever arm has on the cable. In this manner, the adjusting mechanism adjusts the length of the stroke or travel of the lever arm from the brake disengaged position to the brake engagement position.

8 Claims, 8 Drawing Sheets

Fig. 2 - (AMENDED)
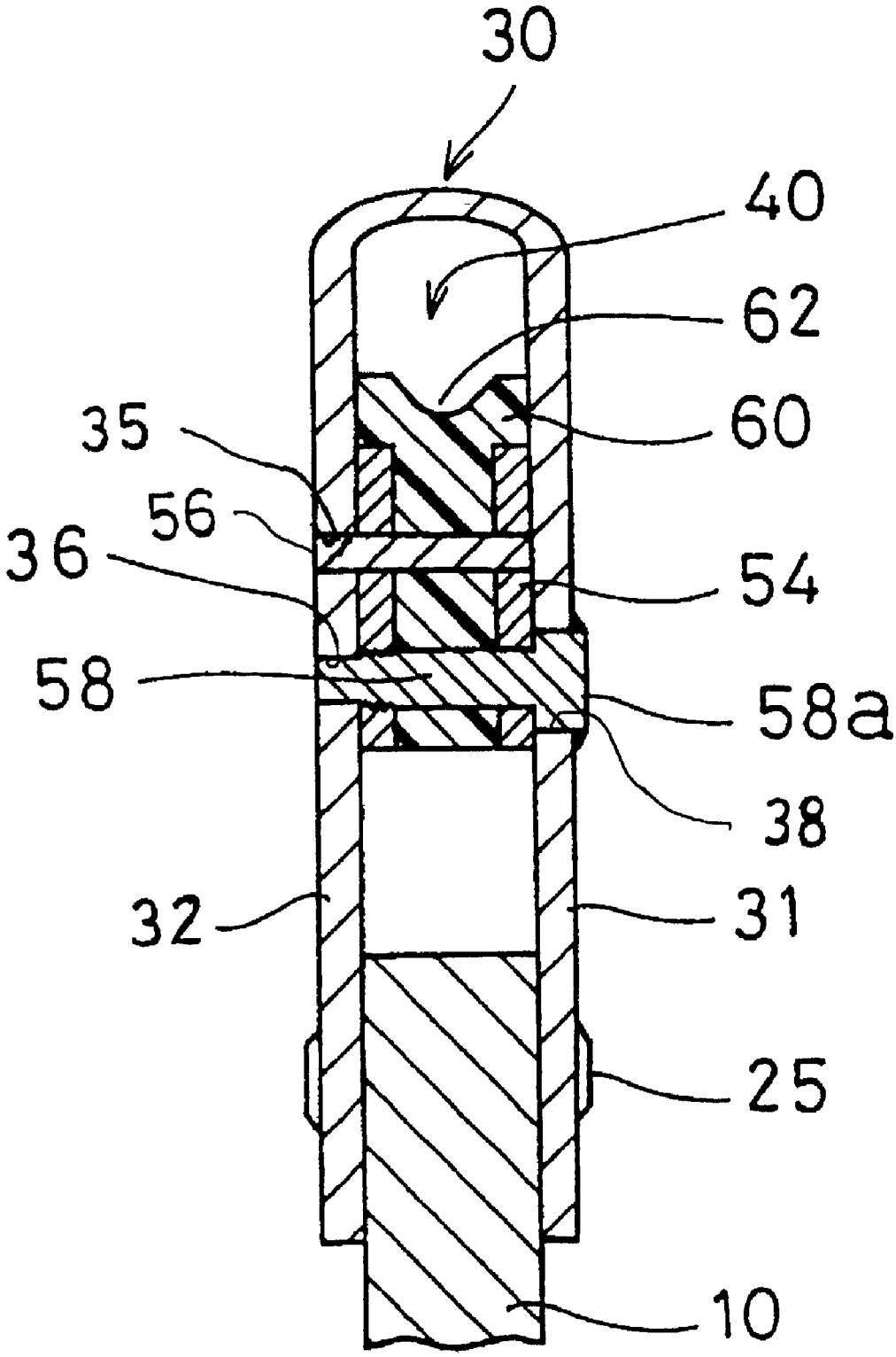

Fig. 3A
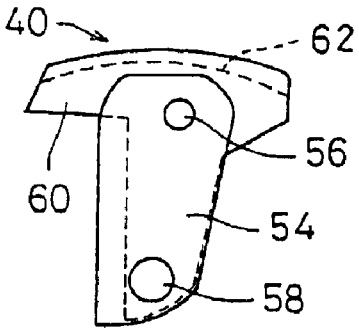
Fig. 3B
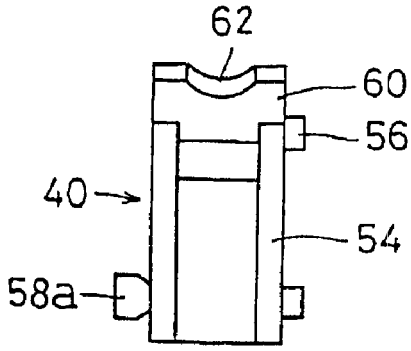
Fig. 3C
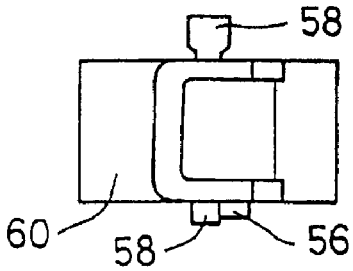
Fig. 4 - (AMENDED)
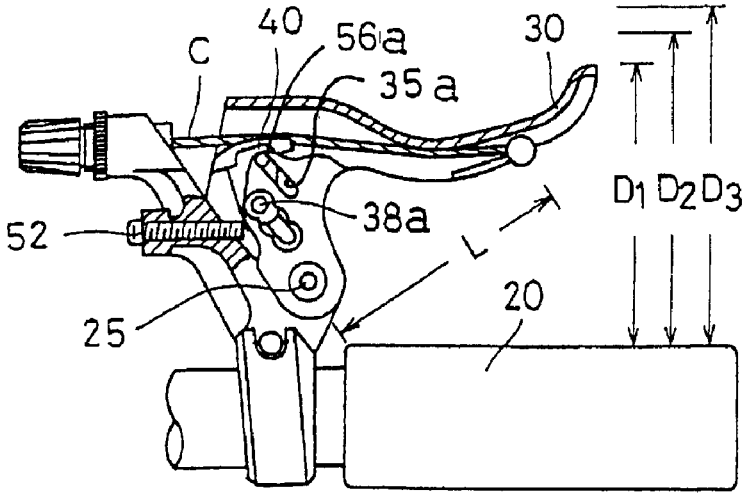

BREAK LEVER STROKE ADJUSTING MECHANISM

Matter enclosed in heavy brackets [ ] appears in the original patent but forms no part of this reissue specification; matter printed in italics indicates the additions made by reissue.

BACKGROUND OF THE INVENTION

A. Field of the Invention

The invention relates to a brake lever arm having an adjusting mechanism therein which adjusts the reach of the brake lever arm and the length of the movement of the brake lever arm.

B. Description of the Related Art

At one time, brake actuating mechanisms for bicycles were merely levers coupled to the handle bar of a bicycle with *one end of* a cable connected to the lever, *and* the opposite end of the cable being connected to a brake mechanism adjacent to one of the bicycle wheels. However, brake mechanisms and brake actuating mechanisms have become very sophisticated in recent years.

Brake actuating mechanisms usually include a lever arm mounted to a base member for pivotal movement. The base member is typically mounted to a handlebar of a bicycle. A cable extends from the brake mechanism to the lever arm. The lever arm pivots between a brake engagement position and a brake disengagement position. In the brake engagement position, the cable is pulled by the lever arm so that the brake mechanism is engaged to stop tire rotation. In the brake disengagement position, the cable tension is released and the brake mechanism is disengaged. Typically, in the brake disengagement position, the lever arm is spaced apart from the handlebar by a predetermined distance. In the brake engagement position, the lever arm is closer to the handlebar than it is in the brake disengagement position.

Until recently, the lever arm on brake actuation mechanisms were manufactured in accordance with a one size fit all approach. A single generic lever arm was expected to be used by all types of bicyclists. However, the needs of individual bicycle users differs from person to person. For instance, some bicyclists have small hands and some have large hands. Those bicyclists with small hands and short fingers have a short reach and therefore may have difficulty keeping the palm of their hands on a bicycle handlebar grip [and] *while* reaching the lever arm. Conversely, a bicyclist with large hands may find that his fingers wrap too easily around the lever arm and may not have an optimal engagement with the lever arm.

Recently, brake actuation mechanisms have been introduced which include an adjustment mechanism which allows adjustment of the location of the lever arm when the brake mechanism is in a brake disengagement position. The brake disengagement position [adjustment] is defined as the reach of a lever arm. Such reach adjustment mechanisms at least allow for some user adjustable features enabling a manufacturer to manufacture one component that may be used by a variety of bicyclists.

Such adjustable lever arms have a sever shortcoming in that the stroke of the lever arm is not adjusted accordingly. The stroke of the lever arm is defined as the total distance the lever arm moves from the brake disengagement position to the brake engagement position. The stroke length may be small or large depending on many things such as the brake mechanism used, how well the brake mechanism is adjusted, the length of the cable, to name a few. Adjustable lever arms appear to fail to provide for the lever arm stroke length. For instance, in the case where the stroke is relatively large and the adjustable lever arm is adjusted to accommodate small hands, the lever arm would be adjusted to be closer to the handlebar in the brake disengagement position. After such an adjustment, the lever arm might contact the handlebar before the brake is engaged causing a safety hazard for the bicyclist.

SUMMARY OF THE INVENTION

One object of the invention is to provide a brake lever arm with an adjustment mechanism which allows for adjustment of both the reach and the stroke of a bicycle brake lever arm.

In one aspect of the present invention, a brake lever mechanism includes a base member formed with a cable guide and the base member having a pivot point defined thereon spaced apart from the cable guide. The brake lever also includes a lever arm formed with a handle portion and a support portion[, the]. *The* support portion *is* mounted for pivotal movement on the pivot point from a brake disengagement position to a brake engagement position[, the]. *The* support portion *is* formed with a *first* slot therein, and the handle portion *is* formed with a cable connector. Mounted within the *first* slot is an adjusting mechanism[, the]. *The* adjusting mechanism [having] *has* a cable contact point, wherein the adjusting mechanism adjusts the relative position between the cable contact point and the pivot point.

Preferably a fine adjusting mechanism extends through a portion of the base member for engagement with the support portion. The fine adjusting mechanism adjusts the relative position between the lever arm and the cable guide with the lever arm in the brake dis-engagement position.

Alternatively, the fine adjusting mechanism extends through a portion of the base member for engagement with the adjusting mechanism, wherein the fine adjusting mechanism adjusts the relative position between the lever arm and the cable guide with the lever arm in the brake disengagement position.

Preferably, the support portion of the lever arm is formed with a second slot generally parallel to the *first* slot. The adjusting mechanism is formed with a pin extending through the *first* slot and the adjusting mechanism includes a screw extending [though] *through* the second slot.

Preferably, the *first* slot extends lengthwise in the support portion from a point proximate the pivot point *to a point further* away from the pivot point.

Preferably, the adjusting mechanism includes a first portion having at least one pin member which extends through the *first* slot in the support portion[, and the]. *The* adjusting mechanism *further* includes a contact member attached to the first portion, *with* the cable contact point being formed on the contact member.

Preferably, the cable guide includes an aperture extending through a portion of the base member and a cable length adjusting member encircling one end of the aperture on threads formed on the base member.

Preferably, the support portion of the lever arm includes generally parallel first and second support portions spaced apart from one another. [extending from the lever portion, the slot having parallel first and second slots formed in the first and second support portions, respectively, the] *The* adjusting mechanism [being] *is* disposed between the first and second support portions[, and the adjusting mechanism having a pin which extends through the first and second slots].

Preferably, [the] *the support portion of the lever arm further comprises third and fourth slots. The* first and second support portions are formed with *the first, second,* third and fourth slots generally parallel to [the first and second slot, respectively, and the] *each other. The* adjusting mechanism includes *a pin extending through the first and fourth slots, and* a screw extending through the *second and* third slots. [and the adjusting mechanism includes threaded member engaging the screw extending though the fourth slot.]

These and other objects, features, aspects and advantages of the present invention will become more fully apparent from the following detailed description of the present invention when taken in conjunction with the accompanying drawings where like reference numerals denoted corresponding parts throughout, in which:

BRIEF DESCRIPTION OF THE DRAWINGS

FIG. 1C is a side elevation

FIG. 2 is a section of the brake lever arm taken along the line II-II in FIG. 1A, looking in the direction of the arrow, and shown on a slightly enlarged scale, showing details of an adjusting mechanism disposed within the brake lever arm;

FIGS. 3A, 3B and 3C are views of the adjusting mechanism depicted in FIG. 2, shown removed from the brake lever arm;

FIGS. 4-6 are fragmentary side elevations with phantom line details showing an alternate embodiment of the brake lever arm depicted in FIGS. 1A, 1B and 2 with the adjusting mechanism in a first position, where FIG. 4 shows the brake lever arm in a brake disengagement position, FIG. 5 shows the brake lever arm in an intermediate position, and FIG. 6 shows the brake lever arm positioned in engagement with a handlebar grip;

FIG. 7 shows the brake lever arm in a brake disengagement position, FIG. 8 shows the brake lever arm in an intermediate position, and FIG. 9 shows the brake lever arm positioned in engagement with the handlebar grip;

FIG. 10 shows the brake lever arm in a brake disengagement position, FIG. 11 shows the brake lever arm in an intermediate position, and FIG. 12 shows the brake lever arm positioned in engagement with the handlebar grip;

DETAILED DESCRIPTION OF THE PREFERRED EMBODIMENTS

Figure 1A:
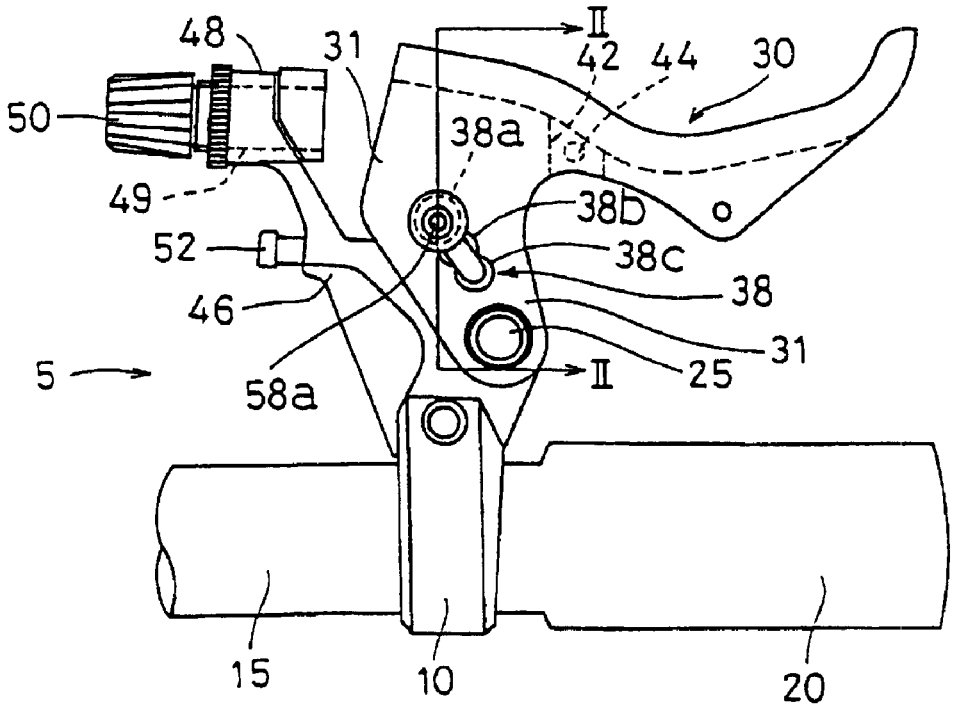
FIG. 1A is a side elevation of a brake lever arm attached to a handlebar in accordance with a first embodiment of the present invention.
Figure 1B:
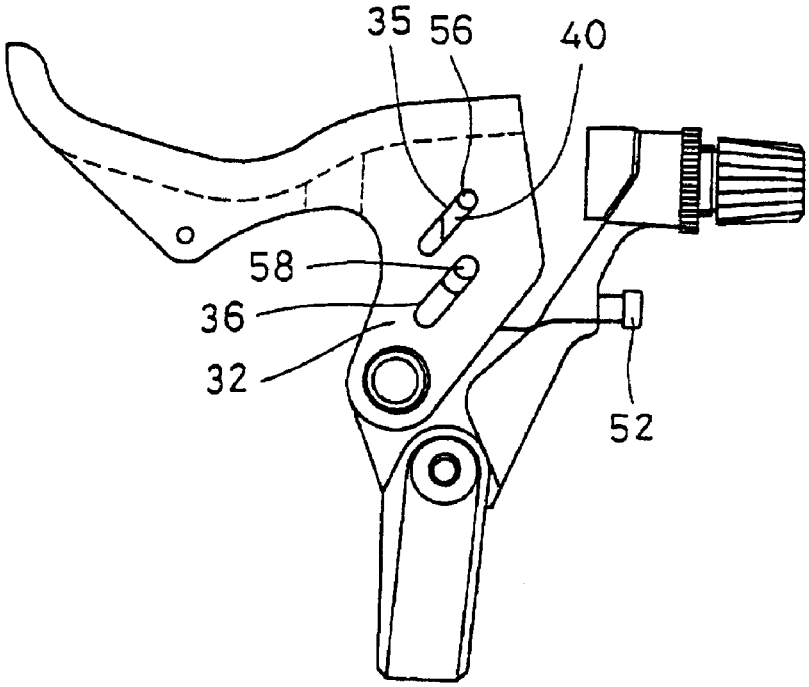
FIG. 1B is a side elevation similar to FIG. 1, but showing the opposite side of the brake lever arm.

In FIGS. 1A and 1B, there is shown a bicycle brake mechanism 5 that includes a base 10 that is connected to a bicycle handlebar 15. The handlebar 15 also includes a grip 20 to accommodate a bicyclist's hand (not shown). A pivot pin 25 extends through the base 10 and a lever arm 30. The lever arm 30 pivots freely about the pivot pin 25.

The lever arm 30 has a U-shaped cross-section, as shown in FIG. 2. The lever arm 30 [is therefore] has a generally hollow interior [and has] *defined by* generally parallel opposing sides 31 and 32. The side 32 includes a first slot 35 and a third slot 36, as shown in FIG. 1B. The side 31 includes a second slot 38, which has an irregular shape, as will be described in greater detail below. Disposed between the two sides 31 and 32 is an adjusting mechanism 40, which is also described in greater detail below.

The lever arm 30 is also formed with a cable retainer 42 which accommodates and retains the ball end 44 of a cable (not shown in FIGS. 1A and 1B). In FIGS. 1A and 1B the ball end 44 of the cable end is shown but the cable is not shown for greater clarity. The cable C is shown in FIGS. 4-12, and is described in greater detail below.

With reference to FIGS. 1A and 1B, the base 10 also includes an extending portion 46 which has a distal end 48. The distal end 48 is formed with a threaded bore 49 through which a cable adjusting mechanism 50 extends. An adjusting screw 52 extends through the extending portion 46, as is described in greater detail below.

The adjusting mechanism 40 is shown in cross section in FIG. 2, and is also shown removed from the lever arm 30 in FIGS. 3A, 3B and 3C. The adjusting mechanism 40 includes a main body 54 which has a generally U-shape in cross-section, as shown in FIG. 3C. The main body 54 includes a pin 56 extending though holes formed on either side of the main body 54 and a screw 58 also extending though the main body 54, the screw 58 engaging threads formed in the main body 54. The screw 58 also extends through a contact body 60. The pin 56 is fitted tightly within the main body 54 by, for instance, press fitting the pin 56 in holes formed in the main body 54.

The contact body 60 generally has a T-shape, as shown in FIG. 3B, the lower portion 60a of the contact body 60 extending into the interior of the main body 54. The contact body 60, as indicated in FIG. 2, is made of a resin or plastic material. The upper portion of the contact body 60 is formed with a recess 62 that extends the length of the upper portion of the contact body 60.

With the adjusting mechanism 40 disposed within the lever arm 30, the pin 56 extends into the first slot 35 formed in the side 32. Further, the screw 58 extends into the third slot 36 formed in the side 32 and the head 58a of the screw 58 extends through the second slot 38 formed in the side 31. When the screw 58 is loosened, the adjusting mechanism 40 is able to slide freely within the length of the slots 35, 36 and 38.

The adjusting mechanism 40 is configured to move to three positions within the lever arm 30. Correspondingly, the second slot 38 is formed with three rounded sections 38a, 38b and 38c to accommodate a screw head 58a formed on the end of the screw 58. In order to change the position of the adjusting mechanism 40, the screw 58 must be loosened so that the head 58a of the screw 58 extends above the surface of the side 31 of the lever arm 30. With the screw 58 loose, the adjusting mechanism 40 is able to slide within the confines of the first slot 35 and the second slot 38. The screw 58 may be tightened so that the head 58a extends into one of the three rounded sections 38a, 38b or 38c, each of the rounded sections corresponding to the three positions, which are described in greater detail below. It should be appreciated that the second slot 38 may be provided with only two rounded sections or may be formed with four or more rounded sections to provide corresponding numbers of adjustment positions for the adjusting mechanism 40. It should further be appreciated that the screw 58 may be replaced with a spring loaded pin which may be urged by a spring into the rounded sections 38a, 38b or 38c and by pushing on the spring loaded pin, the adjusting mechanism 40 may be moved into a desired position.

FIGS. 4 through 12 depict the present invention in an alternate embodiment where [the first] *a fourth* slot 35*a* has also been formed in the side 31 and [the] *a* pin 56*a* extends into the [first] *fourth* slot 35*a* formed in the side 31. Further, the cable C connects to the lever arm 30 in an alternate manner.

Figure 7:
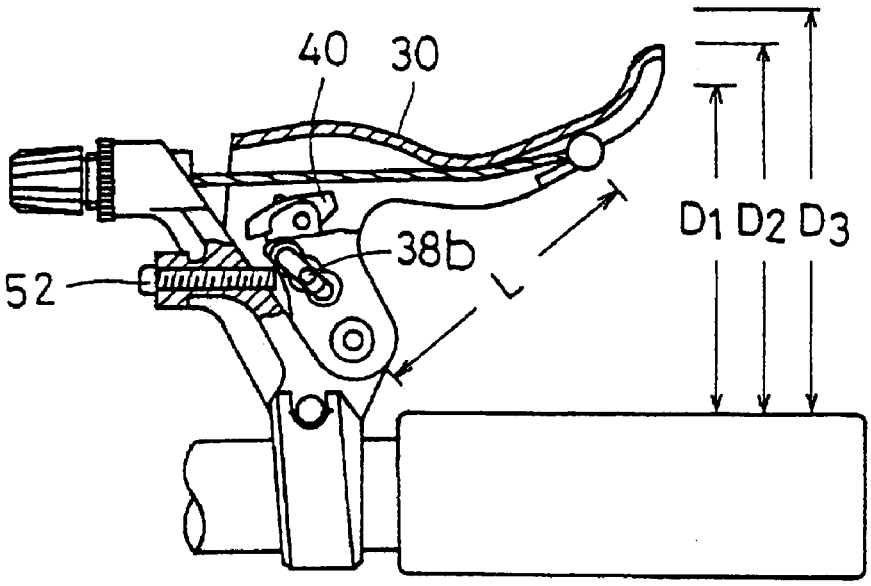
FIGS. 7-9 are fragmentary side elevations, similar to FIGS. 4-6, showing the brake lever arm adjusting mechanism in a second position, where
Figure 8:
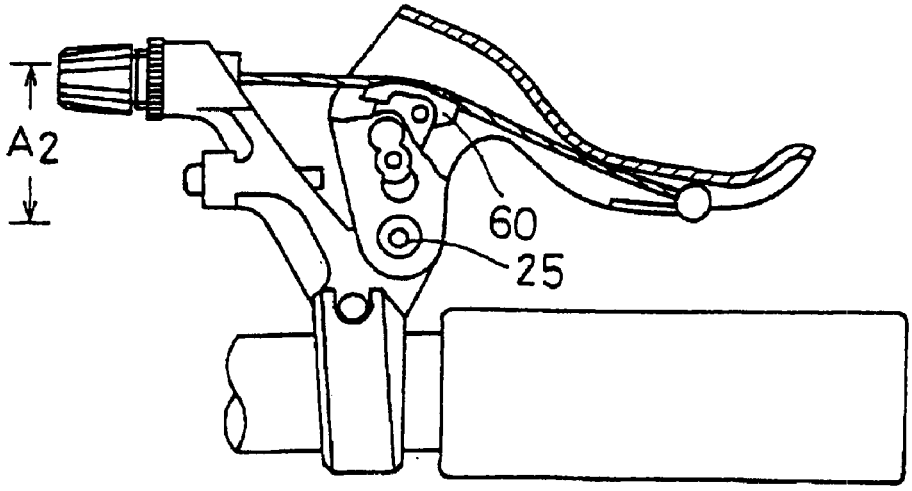
Figure 9:
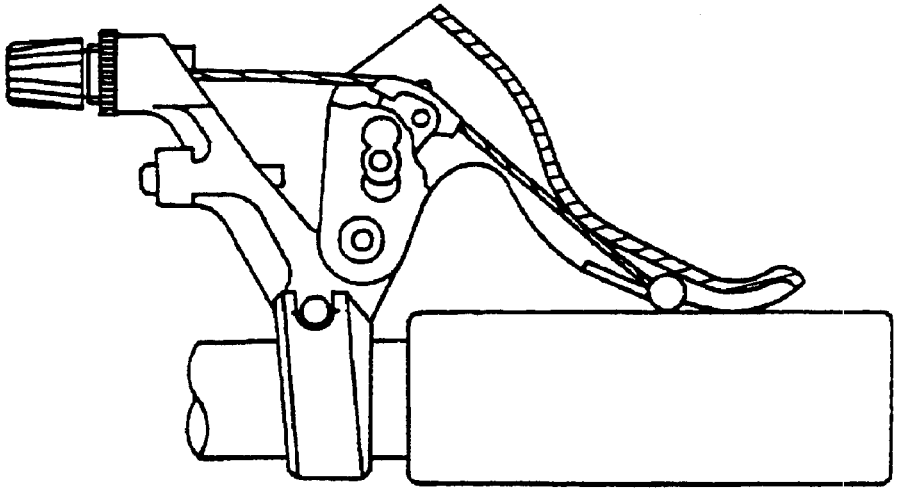
Figure 10:
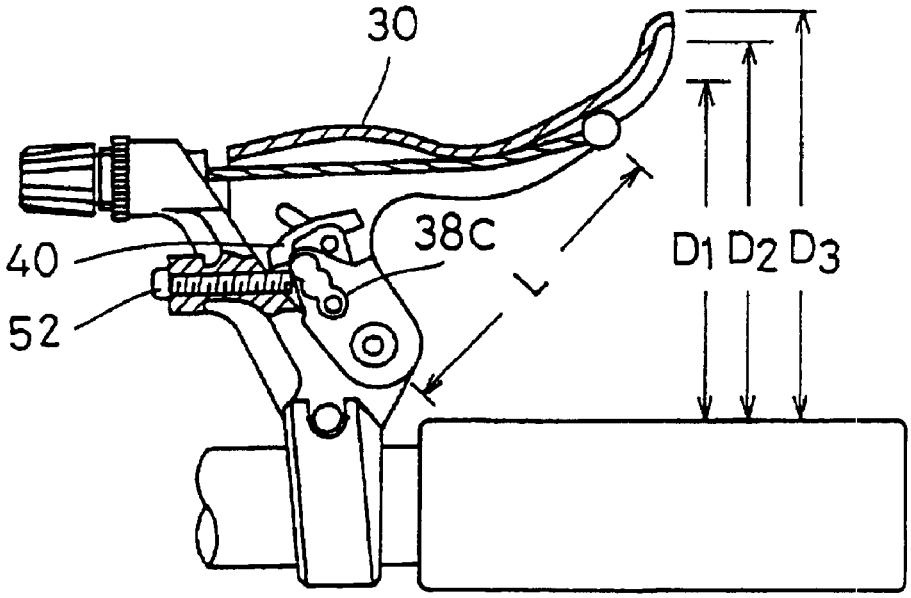
FIGS. 10-12 are fragmentary side elevations, similar to FIGS. 4-6, showing the brake lever arm adjusting mechanism in a third position, where
Figure 11:
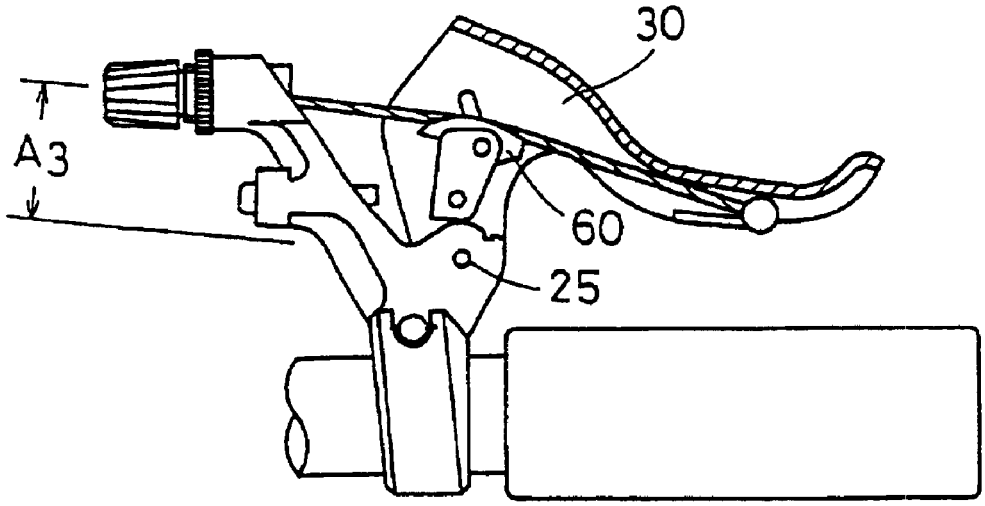
Figure 12:
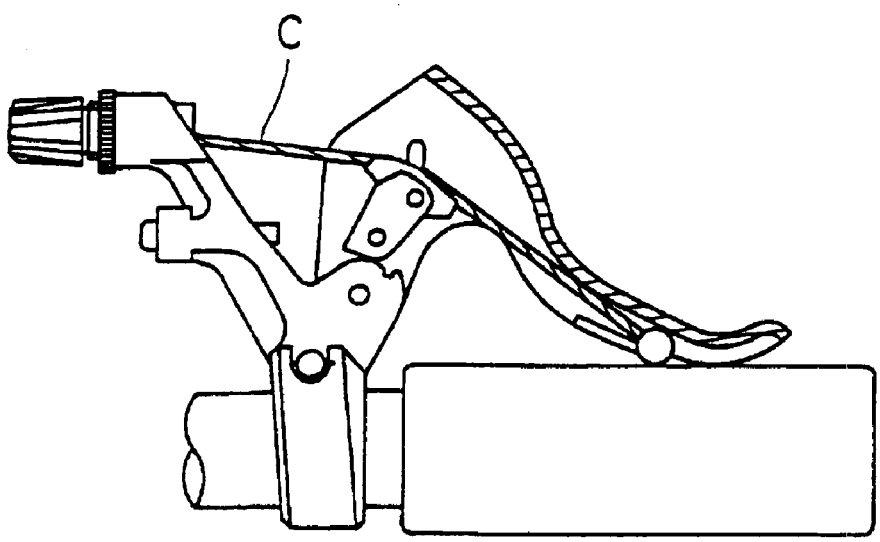

In FIGS. 4-12, the three positions of the adjusting mechanism 40 are depicted. For instance, in FIGS. 4-6 the adjusting mechanism 40 is shown in a first position with the head 58a disposed in the rounded section 38a. In FIGS. 7-9 the adjusting mechanism 40 is shown in a second position with the head 58a disposed in the rounded section 38b. In FIGS. 10-12 the adjusting mechanism 40 is shown in a first position with the head 58a disposed in the rounded section 38c.

With reference to FIG. 4, various measurements are indicated. FIG. 4 shows the lever arm 30 in a first brake disengagement position where the lever arm 30 is a distance $D_1$ away from the handlebar grip 20. A brake lever arm distance L is defined from the carrier of the pivot pin 25 to the center of the cable end 44. It should be noted that the brake lever arm distance L is constant throughout all of the various positions depicted in FIGS. 4 through 12.

It should further be noted that for all measurements shown in FIGS. 4 though 12, the adjusting screw 52 is held in a constant position to define the various the brake disengagement positions, described below.

Figure 5:
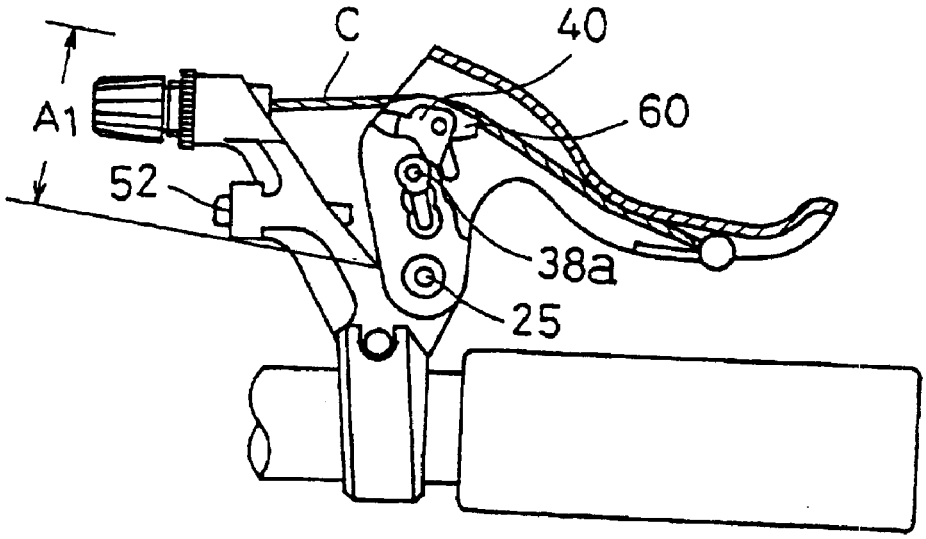
Figure 6:
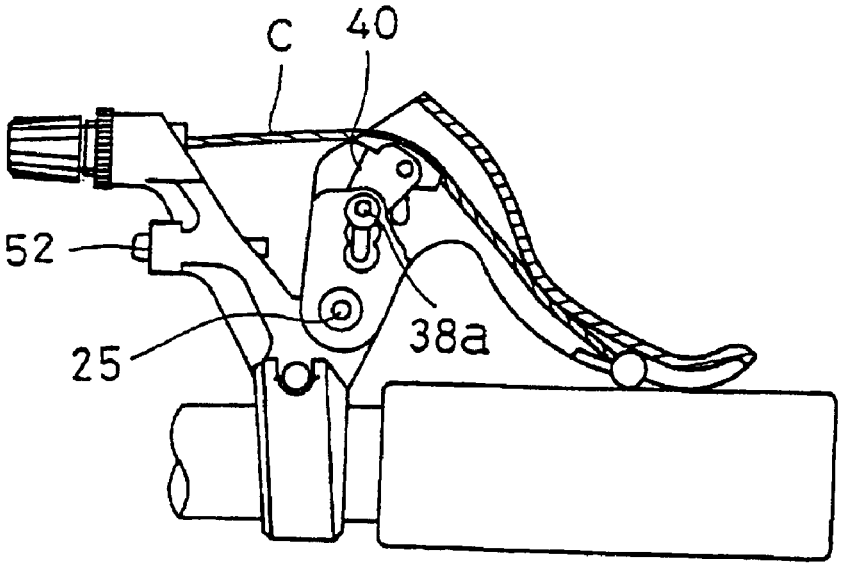

FIG. 5 shows the brake lever arm 30 in an intermediate position between the brake engagement and brake disengagement positions. A first adjustable lever distance $A_1$ is defined from the center of the pivot pin 25 to the recess 62 where the cable C contacts the contact body 60. It should be appreciated that the first adjustable lever distance $A_1$ is constant in FIGS. 4, 5 and 6 where the adjusting mechanism 40 is positioned with the screw head 58a disposed in the first rounded portion 38a of the second slot 38.

FIG. 7 shows the brake lever arm in a second brake disengagement position, where the lever arm 30 is a distance $D_2$ away from the handlebar grip 20 due to the head 58a of the screw 58 being positioned in the second rounded portion 38b of the slot 38.

FIG. 8 shows the brake lever arm in an intermediate position. A second adjustable lever distance $A_2$ is defined from the center of the pivot pin 25 to the recess 62 where the cable C contacts the contact body 60. It should be appreciated that the second adjustable lever distance $A_2$ is constant in FIGS. 7, 8 and 9 where the adjusting mechanism 40 is positioned with the screw head 58a disposed in the second rounded portion 38b of the second slot 38.

FIG. 10 shows the brake lever arm in a third brake disengagement position, with the adjusting mechanism 40 in a third position where the head 58a of the screw 58 is disposed in the third rounded section 38c of the slot 38. In FIG. 10, the lever arm 30 is a distance $D_3$ away from the handlebar grip 20.

FIG. 11 shows the brake lever arm in an intermediate position. A third adjustable lever distance $A_3$ is defined from the center of the pivot pin 25 to the recess 62 where the cable C contacts the contact body 60. It should be appreciated that the third adjustable lever distance $A_3$ is constant in FIGS. 10, 11 and 12 where the adjusting mechanism 40 is positioned with the screw head 58a disposed in the third rounded portion 38c of the second slot 38.

The various positions of the lever arm distance $D_1$, $D_2$, and $D_3$ represent the reach of the lever arm 30.

As is shown in the figures, the following relationships are true:

$A_1>A_2>A_3$;

$D_1<D_2<D_3$; and

L=constant throughout.

There are several geometrical relationships that are fundamental to the operation of the bicycle brake mechanism 5. First, the reach distance $D_1$, $D_2$ or $D_3$ is easily adjusted by moving the adjusting mechanism 40 into any one of the three rounded sections 38a, 38b or 38c. Adjustment of the reach distance $D_1$, $D_2$ or $D_3$ also alters the stroke length or total movement of the lever arm 30 due to the setting of the adjustable lever distances $A_1$, $A_2$ or $A_3$. The adjustable lever distances alter the stroke length of the lever arm 30 by contacting the cable at a points having differing distances from the pivot pin 25. The movement of the cable C is directly proportional to the size of the adjustable lever distances $A_1$, $A_2$ or $A_3$. Hence, for the reach distance $D_1$, the adjustable lever distance $A_1$ has a relatively large value and therefore, as the lever arm 30 moves, the cable C will move about the pivot pin 25 a corresponding short stroke length until the brake mechanism (not shown) is engaged. For the reach distance $D_2$, the adjustable lever distance $A_2$ has an intermediate value and therefore, as the lever arm 30 moves, the cable C will move about the pivot pin 25 a corresponding intermediate stroke length until the brake mechanism (not shown) is engaged. For the reach distance $D_3$ the adjustable lever distance $A_3$ has a relatively small value and therefore, as the lever arm 30 moves, the cable C will move about the pivot pin 25 a corresponding long stroke length until the brake mechanism (not shown) is engaged.

Comparing the three positions of the adjusting mechanism 40 it is shown in the present invention that as the reach ($D_1$, $D_2$ or $D_3$) gets smaller, the corresponding stroke length also decreases since the distance (either A1, A2 or A3) from the pivot pin 25 increases. Conversely, as the reach ($D_1$, $D_2$ or $D_3$) gets larger, the corresponding stroke length also increases since the distance (either A1, A2 or A3) from the pivot pin 25 decreases.

Also, the brake disengage position distance $D_1$ provides a short reach for a bicyclist, with the lever arm 30 being relatively close to the handlebar grip 20. Similarly, the brake disengage position distance $D_3$ provides a long reach for a bicyclist, with the lever arm 30 being at a relatively large distance from the handlebar grip 20.

The adjusting screw 52 is shown contacting the adjusting mechanism 40. However, alternatively, the adjusting screw 52 may be configured to contact one or both of the sides 31 and 32. For instance, in FIG. 1C, the adjusting screw 52 is shown contacting side 32. The adjusting screw 52 is mounted in the present invention in part to provide for fine adjustment of the reach of the lever arm 30.

Figure 13:
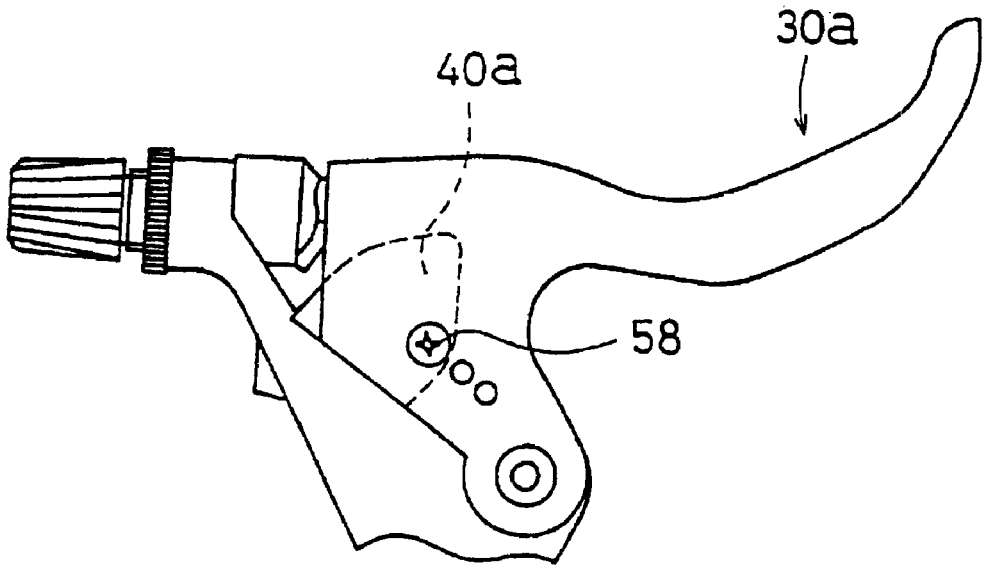
FIG. 13 is a fragmentary side view of the brake lever arm in accordance with another alternate embodiment of the present invention.

Another alternate embodiment is depicted in FIG. 13, where an adjusting mechanism 40a is mounted within a lever arm 30a by the screw 58. In this embodiment, the screw is completely removed before the adjustment mechanism 40a may be moved to different positions. Once in position, the screw 58 must be re-installed.

Figure 14:
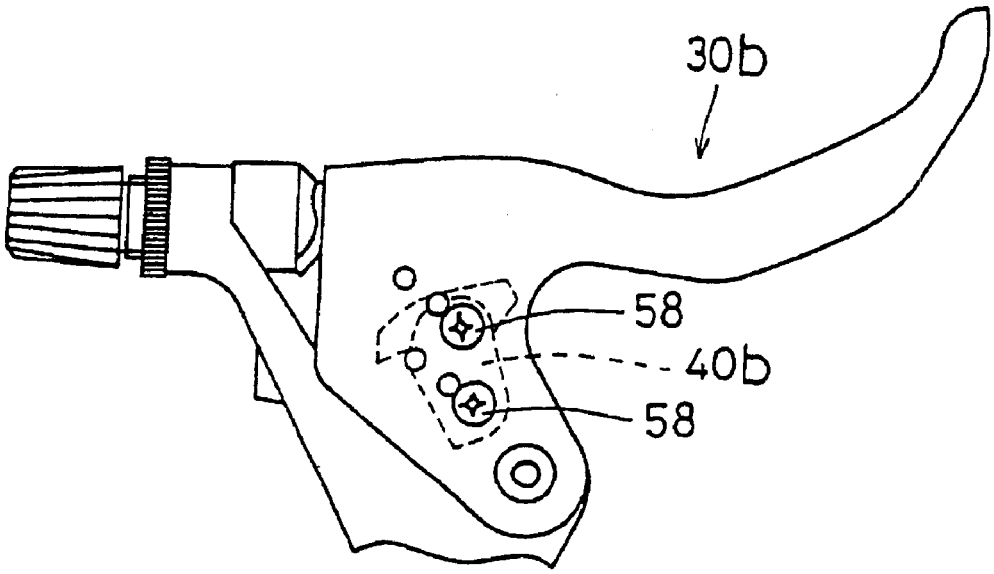
FIG. 14 is a fragmentary side view of the brake lever arm in accordance with yet another alternate embodiment.

In yet another embodiment depicted in FIG. 14, two screws 58 are used to secure an adjusting mechanism 40b into position in a lever arm 30b.

There are numerous advantages in the present invention. For instance, the present invention provides a simple and easy way to adjust the reach of a lever arm. The present invention also provides a simple and easy way to adjust the stroke length of a lever arm. The present invention provides a simple and easy means for simultaneously adjusting both the reach and the stroke of a lever arm.

The present invention also provides a means for fine adjusting a lever arm into a brake disengage position to accommodate various sized bicyclists with differing size hands.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A brake lever mechanism comprising:

a base member formed with a cable guide and said base member having a pivot point defined thereon spaced apart from said cable guide;

a lever arm formed with a handle portion and a support portion, said support portion mounted for pivotal movement on said pivot point from a brake disengagement position to a brake engagement position and said handle portion formed with a cable connector;

an adjusting mechanism mounted in said support portion, said adjusting mechanism having a cable contact point, wherein said adjusting mechanism adjusts the relative position between said cable contact point and said pivot point;

wherein said support portion is formed with a first slot and a second slot generally parallel to said first slot, and said adjusting mechanism is formed with a pin extending through said first slot and said adjusting mechanism includes a screw extending through said second slot, and said adjusting mechanism confined to selective movement along said first and second slots.

2. The brake lever mechanism as in claim 1, further comprising a fine adjusting mechanism extending through a portion of said base member for engagement with said support portion, wherein said fine adjusting mechanism adjusts the relative position between said lever arm and said cable guide with said lever arm in said brake disengagement position.

3. The brake lever mechanism as in claim 1, further comprising a fine adjusting mechanism extending through a portion of said base member for engagement with said adjusting mechanism, wherein said fine adjusting mechanism adjusts the relative position between said lever arm and said cable guide with said lever arm in said brake disengagement position.

4. The brake lever mechanism as in claim 1, [therein] *wherein* said first slot extends lengthwise in said support portion from a point proximate said pivot point *to a point further* away from said pivot point.

5. The brake lever mechanism as in claim 1, wherein said adjusting mechanism comprises a first portion having [at least one] *said* pin member which extends through said first slot in said support portion, and said adjusting mechanism includes a contact body attached to said first portion, said cable contact point being formed on said contact body.

6. The brake lever mechanism as in claim 1, wherein said cable guide comprises an aperture extending through a portion of said base member and a cable length adjusting member encircling one end of said aperture on threads formed on said base member.

7. The brake lever mechanism as in claim 1, wherein said support portion of said lever arm comprises generally parallel first and second support portions spaced apart from one another[extending from said lever portion, said first slot comprising parallel first and third slots formed in said first and second support portions, respectively,] *, and* said adjusting mechanism being disposed between said first and second support portions[, and said adjusting mechanism having said pin which extends through said first and third slots].

8. The brake lever mechanism as in claim 7, wherein *said support portion of said lever arm further comprises third and fourth slots,* said first and second support portions are formed with [said second slot and a fourth slot] *said first, second, third and fourth slots that are* generally parallel to [said first and third slots] *each other*, *and said pin extends through said first and fourth slots* [respectively, and said adjusting mechanism includes] said screw [extending] *extends* through said second and [fourth] *third* slots.

* * * * *